(12) United States Patent
Miyazato et al.

(10) Patent No.: US 7,203,898 B2
(45) Date of Patent: Apr. 10, 2007

(54) DOCUMENT PROCESSING METHOD AND APPARATUS

(75) Inventors: Takuya Miyazato, Kanagawa (JP); Junichiro Kizaki, Kanagawa (JP); Satoshi Nishikawa, Kanagawa (JP); Yasuo Mori, Kanagawa (JP); Junko Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 357 days.

(21) Appl. No.: 10/739,332

(22) Filed: Dec. 19, 2003

(65) Prior Publication Data

US 2004/0133856 A1 Jul. 8, 2004

(30) Foreign Application Priority Data

Dec. 20, 2002 (JP) ............... 2002-371001

(51) Int. Cl.
*G06F 15/00* (2006.01)
(52) U.S. Cl. .................... 715/500; 715/517
(58) Field of Classification Search ........... 715/500, 715/517
See application file for complete search history.

(56) References Cited

U.S. PATENT DOCUMENTS

| | | | | |
|---|---|---|---|---|
| 5,517,621 | A * | 5/1996 | Fukui et al. ............... | 715/517 |
| 5,581,752 | A * | 12/1996 | Inoue et al. .............. | 715/526 |
| 5,960,444 | A * | 9/1999 | Jackson .................... | 707/203 |
| 6,182,092 | B1 * | 1/2001 | Francis et al. ............. | 715/513 |
| 6,480,866 | B2 * | 11/2002 | Mastie ..................... | 715/525 |
| 6,848,079 | B2 * | 1/2005 | Ito ......................... | 715/523 |
| 7,051,047 | B2 * | 5/2006 | Jung et al. .............. | 707/104.1 |
| 7,054,891 | B2 * | 5/2006 | Cole ....................... | 707/201 |
| 2001/0011283 | A1 * | 8/2001 | Kato et al. ................ | 707/511 |
| 2001/0051964 | A1 * | 12/2001 | Warmus et al. ............ | 707/530 |
| 2002/0060802 | A1 * | 5/2002 | Hino ...................... | 358/1.13 |
| 2002/0069228 | A1 * | 6/2002 | Mori et al. ............... | 707/524 |
| 2002/0114009 | A1 * | 8/2002 | Stevens et al. ........... | 358/1.18 |
| 2002/0116418 | A1 * | 8/2002 | Lachhwani et al. ........ | 707/517 |
| 2002/0138519 | A1 * | 9/2002 | Miller ..................... | 707/517 |
| 2003/0028553 | A1 * | 2/2003 | Kondo ..................... | 707/200 |
| 2003/0053113 | A1 * | 3/2003 | Nishikawa et al. ....... | 358/1.14 |
| 2003/0055748 | A1 * | 3/2003 | Bezrukov et al. .......... | 705/27 |
| 2003/0056177 | A1 * | 3/2003 | Nara et al. ............... | 715/525 |
| 2003/0056179 | A1 | 3/2003 | Mori ...................... | 715/530 |
| 2003/0056180 | A1 | 3/2003 | Mori ...................... | 715/530 |
| 2003/0090717 | A1 * | 5/2003 | Yoshida et al. ........... | 358/1.15 |
| 2003/0120602 | A1 * | 6/2003 | Jung et al. ................ | 705/51 |
| 2003/0160977 | A1 * | 8/2003 | Nishikawa et al. ........ | 358/1.2 |
| 2003/0177119 | A1 * | 9/2003 | Cole ........................ | 707/7 |
| 2003/0177247 | A1 * | 9/2003 | Dunning et al. .......... | 709/228 |

(Continued)

FOREIGN PATENT DOCUMENTS

WO    WO 01/59696    8/2001

*Primary Examiner*—Cong-Lac Huynh
(74) *Attorney, Agent, or Firm*—Fitzpatrick, Cella, Harper & Scinto

(57) ABSTRACT

A document processing technique using a computer having an application program for creating application data and a layout program for performing layout processing of document data is provided. A document processing method according to the present invention includes a conversion step of converting application data created by the application program into document data processible by the layout program, in response to an instruction from the application program, and a control step of controlling to open the document data obtained in conversion processing, by the layout program in response to conversion processing in the conversion step.

10 Claims, 10 Drawing Sheets

U.S. PATENT DOCUMENTS

| | | |
|---|---|---|
| 2003/0210898 A1* | 11/2003 | Juen et al. ................... 386/117 |
| 2003/0233363 A1* | 12/2003 | Cohen et al. ................ 707/100 |
| 2004/0003121 A1* | 1/2004 | Tanimoto .................... 709/246 |
| 2004/0098414 A1* | 5/2004 | Chan et al. .................. 707/200 |
| 2004/0210561 A1* | 10/2004 | Shen ............................... 707/3 |
| 2005/0283721 A1* | 12/2005 | Warmus et al. ............. 715/517 |
| 2006/0150091 A1* | 7/2006 | Suzuki et al. ................ 715/517 |
| 2006/0158706 A1* | 7/2006 | Mori et al. .................. 358/540 |

* cited by examiner

DOCUMENT PROCESSING METHOD AND APPARATUS

FIELD OF THE INVENTION

The present invention relates to a document processing technique which provides a data conversion function in transferring document data to another program.

BACKGROUND OF THE INVENTION

Conventionally, to open application data created by a general word processing application (general application) by a layout application which performs layout processing for printing, a document data file is created by a data conversion program of a dedicated printer driver format in accordance with a printing processing operation sequence from the general application. The document data file is inserted into a layout application (by, e.g., drag-and-drop operation) from a desktop window provided by the OS. If a document serving as an original data source is closed, drop operation is performed from the desktop window of the OS. In accordance with this operation, the data is converted into a document data file, and the file is inserted into the layout application.

In any case, application data must be opened in the layout application through an operation in the desktop window of the OS, and cannot be directly opened in the application window. Especially, application data cannot be opened in the layout application from the application window in which the application data is opened, thus resulting in two operation steps.

SUMMARY OF THE INVENTION

It is an object of the present invention to allow inserting application data created by a general application into a layout application by simpler operation.

According to one aspect of the present invention, preferably, a document processing method using a computer which stores an application program for creating application data and a layout program for performing layout processing of document data, comprises: a conversion step of converting application data created by the application program into document data processible by the layout program, in response to an instruction from the application program; and a control step of controlling to open the document data obtained in conversion processing, by the layout program in response to the conversion processing in the conversion step.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

DETAILED DESCRIPTION OF THE PREFERRED EMBODIMENTS

Preferred embodiments of the present invention will now be described in detail in accordance with the accompanying drawings.

The outline of a document processing system according to an embodiment of the present invention will be described. This document processing system converts a data file created by a general application into an electronic document file by an electronic document writer. A layout application provides a function of editing the electronic document file. Details of the system will be explained below.

Figure 1:
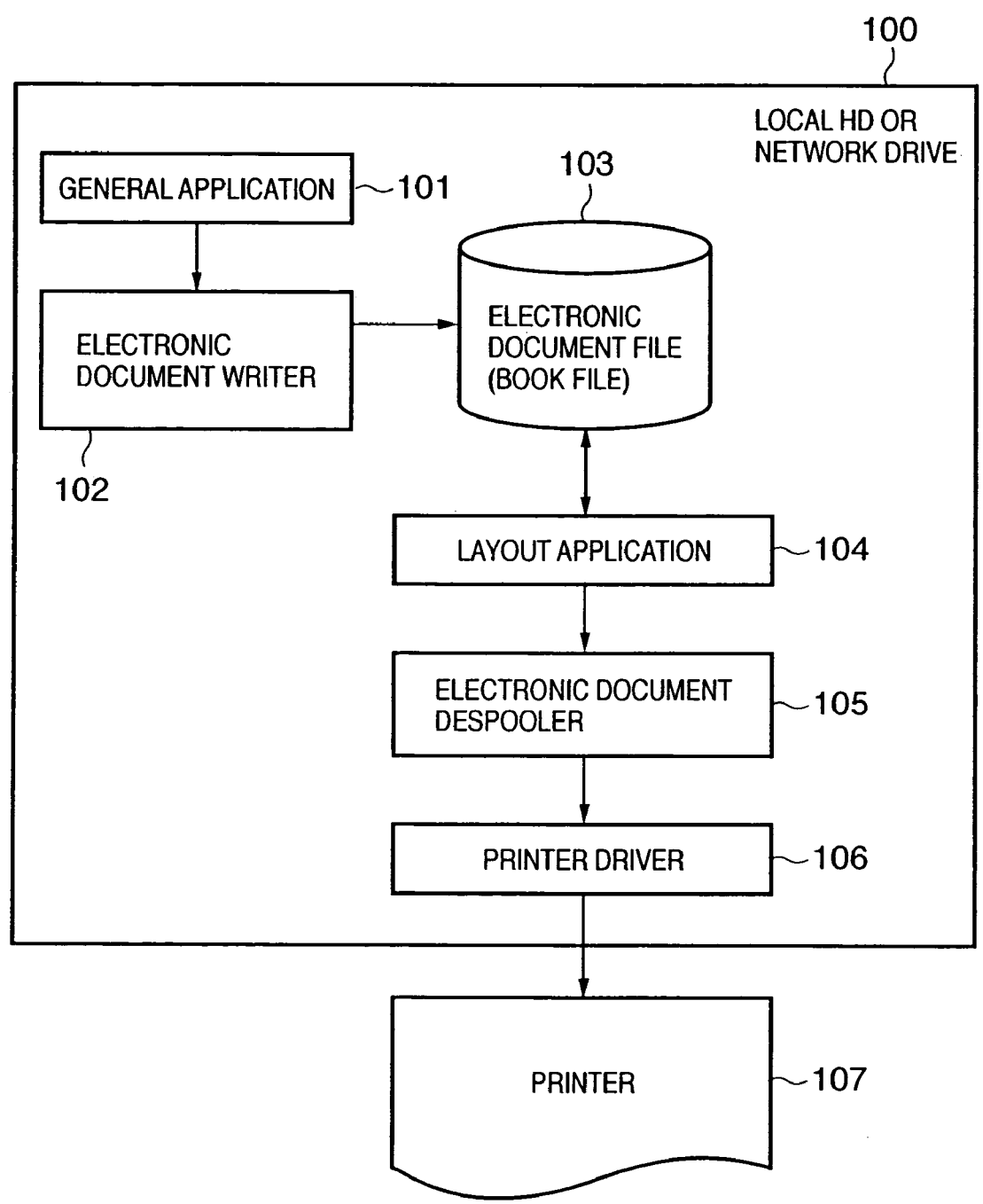
FIG. 1 is a block diagram showing the software configuration of a document processing system according to an embodiment.

FIG. 1 is a block diagram showing the software configuration of the document processing system according to the embodiment of the present invention.

The document processing system is implemented by a digital computer 100 as an embodiment suited to an information processing apparatus according to the embodiment. A general application 101 is an application program which provides functions such as wordprocessing, spreadsheet, photo-retouch, draw, paint, presentation, and text editing. The general application 101 has a printing function. Such application programs utilize a predetermined interface provided by the OS (Operating System) in printing application data such as created document data or image data. To print created data, the application 101 transmits an output command (GDI function) which is determined in advance for the output module of the OS providing the interface and has an OS-dependent format. The output module which has received the output command converts the command into a format processible by an output device such as a printer, and outputs the converted command (DDI function). Since the format processible by the output device changes depending on the type of device, the manufacturer, and the model, a device driver is provided for each device. The OS converts a command by using the device driver to generate printing data, and combines printing data by JL (Job Language) to generate a print job. When the OS is Microsoft Windows®, the output module is a GDI (Graphical Device Interface) module.

An electronic document writer 102 is an improvement of the above-mentioned device drivers, and is a software module provided to implement the document processing system. The electronic document writer 102 does not target a specific output device, and generates an electronic document file 103 by converting an output command into a format processible by a layout application 104 or printer driver 106 (to be described later). The format (to be referred to as an "electronic document format" hereinafter) converted by the electronic document writer 102 is not particularly limited as long as each document page can be expressed by a detailed format. Of substantial standard formats, for example, the PDF format by Adobe Systems and the SGML format can be adopted as electronic document formats.

When the application 101 utilizes the electronic document writer 102, the electronic document writer 102 is designated as a device driver used for output, and then caused to execute printing. An electronic document file created by the electronic document writer 102 does not have a complete electronic document file format. For this reason, the electronic document writer 102 is designated as a device driver by the layout application 104, and executes conversion of application data into an electronic document file under the management of the layout application 104.

The layout application 104 completes a new incomplete electronic document file generated by the electronic document writer 102 as an electronic document file having the following format. In case of necessity to definitely discriminate these files, a file created by the electronic document writer 102 will be called an "electronic document file", and an electronic document file given a structure by the layout application 104 will be called a "book file". If these files need not be particularly discriminated, a document file generated by an application, an electronic document file, and a book file are called document files (or document data).

As described above, the electronic document writer 102 is designated as a device driver, and the general application 101 prints the data. Application data is converted into an electronic document format in pages (to be referred to as "logical pages" or "document pages" hereinafter) defined by the application 101. The converted data is stored as the electronic document file 103 in a storage medium such as a hard disk. The hard disk may be the local drive of the computer which implements the document processing system according to the embodiment, or when the computer is connected to a network, may be a drive provided on the network.

The layout application 104 provides the user with a function of loading and editing the "electronic document file" or "book file" 103. The layout application 104 provides no function of editing the contents of each page, but a function of editing a chapter or book structure (to be described later) made up of pages as a minimum unit.

To print the book file 103 edited by the layout application 104, the layout application 104 activates an electronic document despooler 105. The electronic document despooler 105 reads out a designated book file from the hard disk. To print each page in a format described in the book file, the electronic document despooler 105 generates an output command complying with the output module of the OS described above, and outputs the command to the output module (not shown). At this time, the printer driver 106 of a printer 107 used as an output device is designated as a device driver. The output module converts the output command received using the designated printer driver 106 of the printer 107 into a device command interpretable by the printer 107. The device command is transmitted to the printer 107, which prints an image corresponding to the command.

Figure 2:
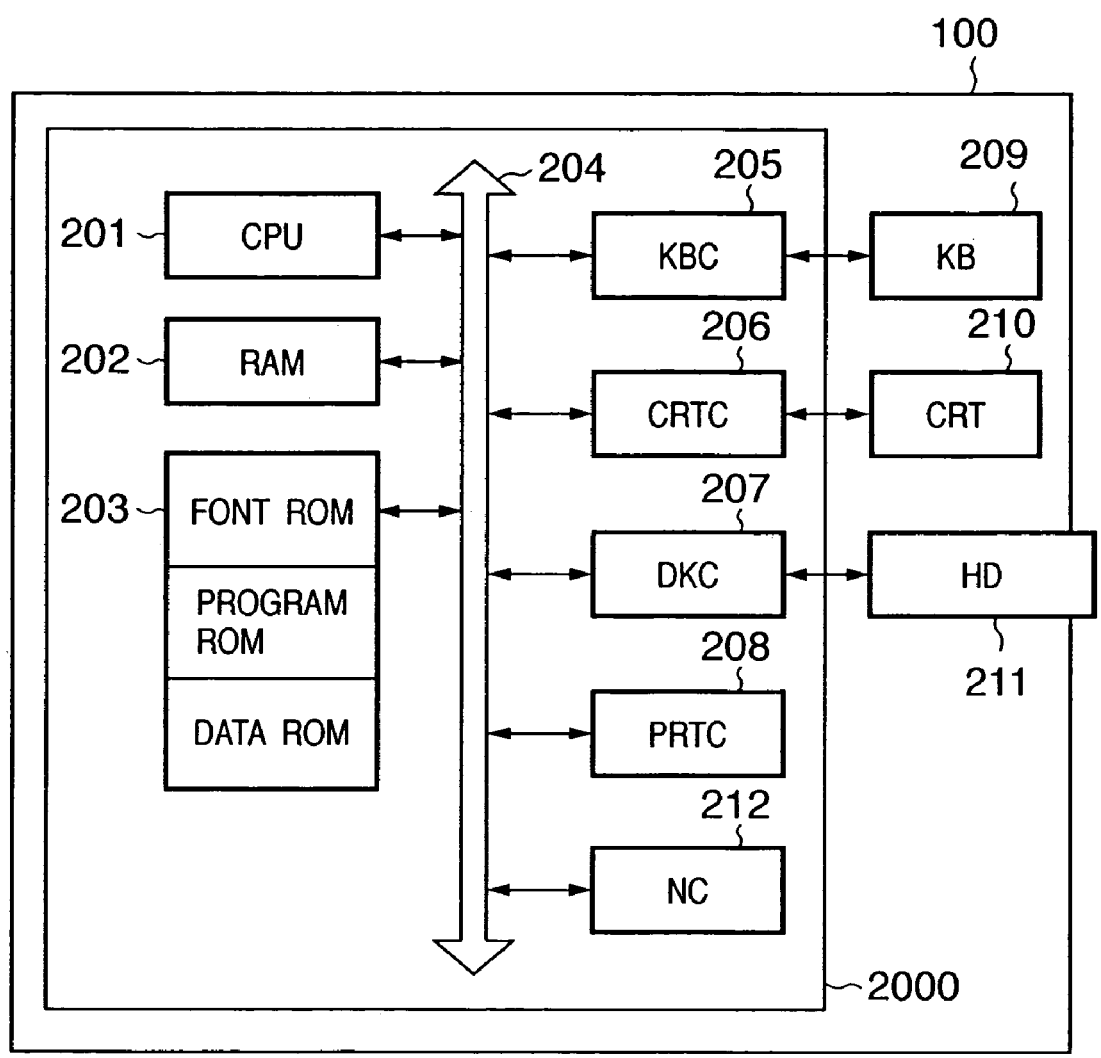
FIG. 2 is a block diagram showing an example of a hardware configuration which implements the document processing system according to the embodiment.

FIG. 2 is a block diagram showing the hardware configuration of the digital computer 100 shown in FIG. 1.

In FIG. 2, a CPU 201 executes a program such as an OS, the general application 101, or the layout application 104 which is stored in the program ROM of a ROM 203 or loaded from a hard disk 211 to a RAM 202, and realizes the software configuration in FIG. 1 or flow chart sequence (to be described later). The RAM 202 functions as the main memory or work area of the CPU 201. A keyboard controller (KBC) 205 controls a key input from a keyboard 209 or an input from a pointing device (not shown) such as a mouse. A CRT controller (CRTC) 206 controls the display on a display 210. The display 210 is not limited to a CRT, and may be a liquid crystal display or plasma display. A disk controller (DKC) 207 controls access to the hard disk (HD) 211 or flexible disk (FD) which stores a boot program, various applications, font data, user files, editing files (to be described later), and the like. A PRTC 208 controls signal exchange with the connected printer 107. An NC 212 is connected to a network, and executes communication control processing with another device connected to the network.

A sequence of creating a book file by the layout application 104 and electronic document writer 102 will be explained. Creation of a book file is realized as part of book file editing operation by the layout application 104.

Figure 3:
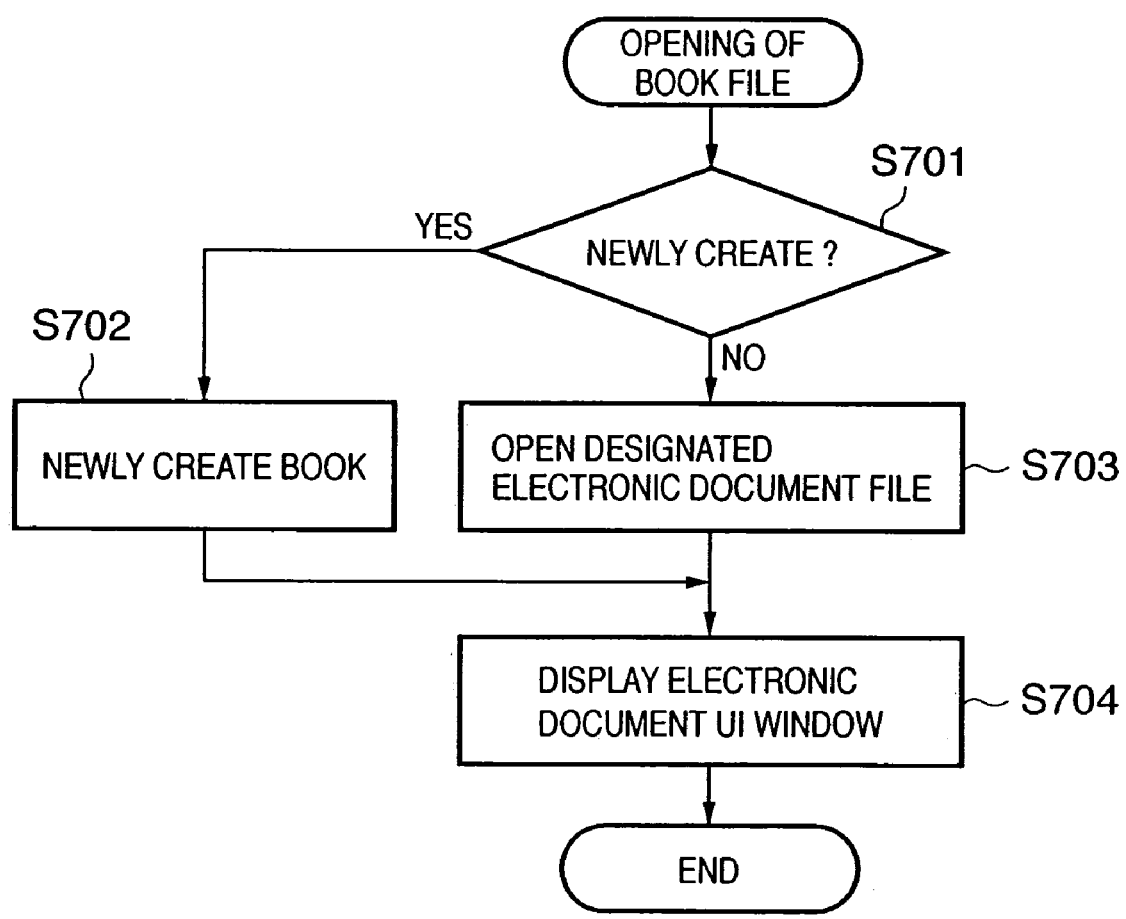
FIG. 3 is a flow chart showing an example of a sequence of opening a book file.

FIG. 3 is a flow chart for explaining a sequence of opening a book file by the layout application 104 according to the embodiment.

In step S701, whether a book file to be opened is one to be newly created or an existing one is determined. If YES in step S701, the processing advances to step S702 to newly create a book file containing no chapter. In the example shown in FIG. 3, the newly created book file is a book node which has only the book node 301 without any link to a chapter node. As the book attribute, a set of attributes prepared in advance for creation of a new book file is applied. The processing advances to step S704 to display a UI (User Interface) window for editing the new book file.

Figure 4:
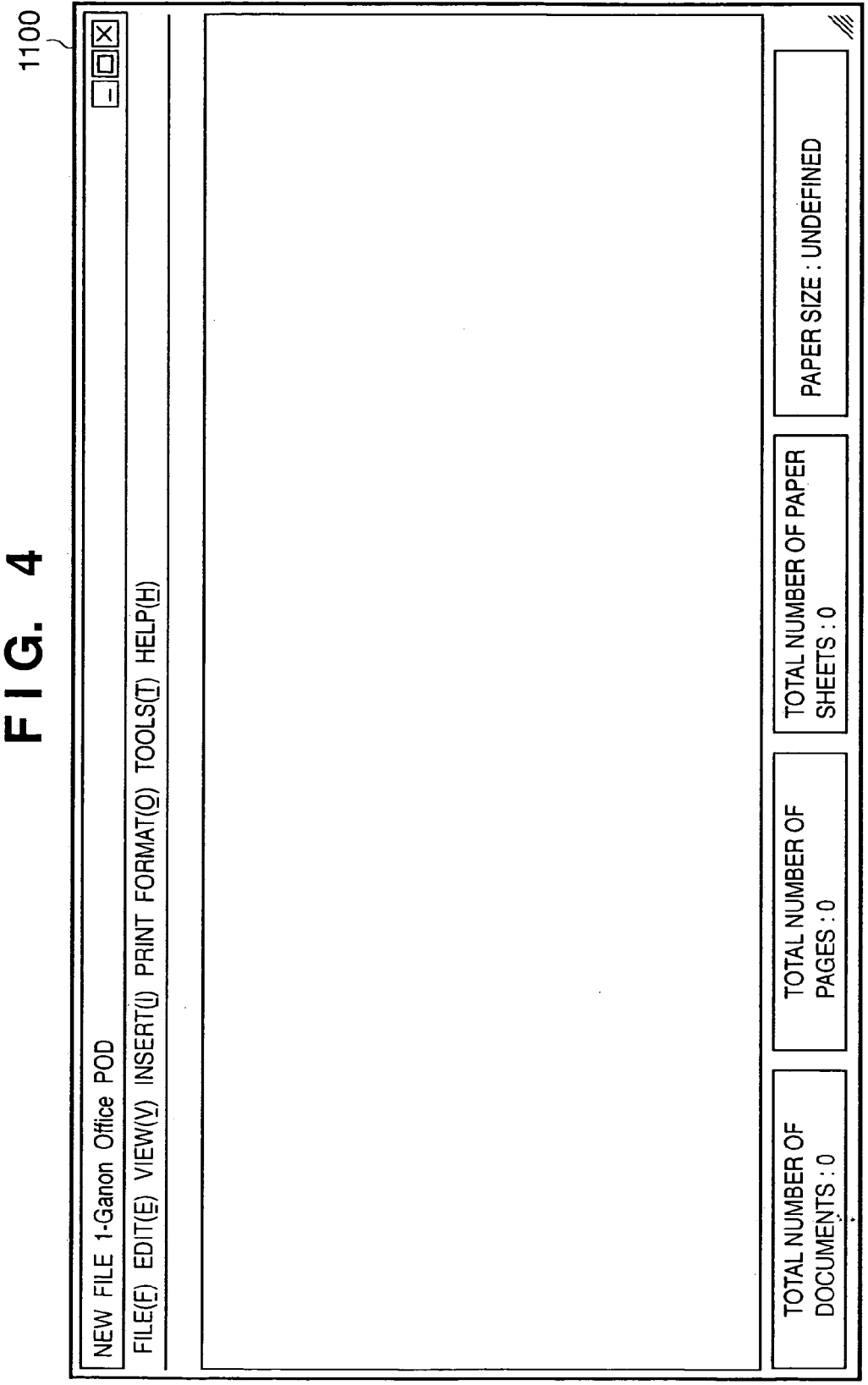
FIG. 4 is a view showing an example of a user interface window when a new book file is opened.

FIG. 4 is a view showing an example of the UI window when a book file is newly created. In this case, a UI window 1100 does not display any information because the book file does not have any substantial content.

If NO in step S701, the processing advances to step S703 to open a designated book file and display a UI (User Interface) window in accordance with the structure, attribute, and contents of the book file.

Figure 5:
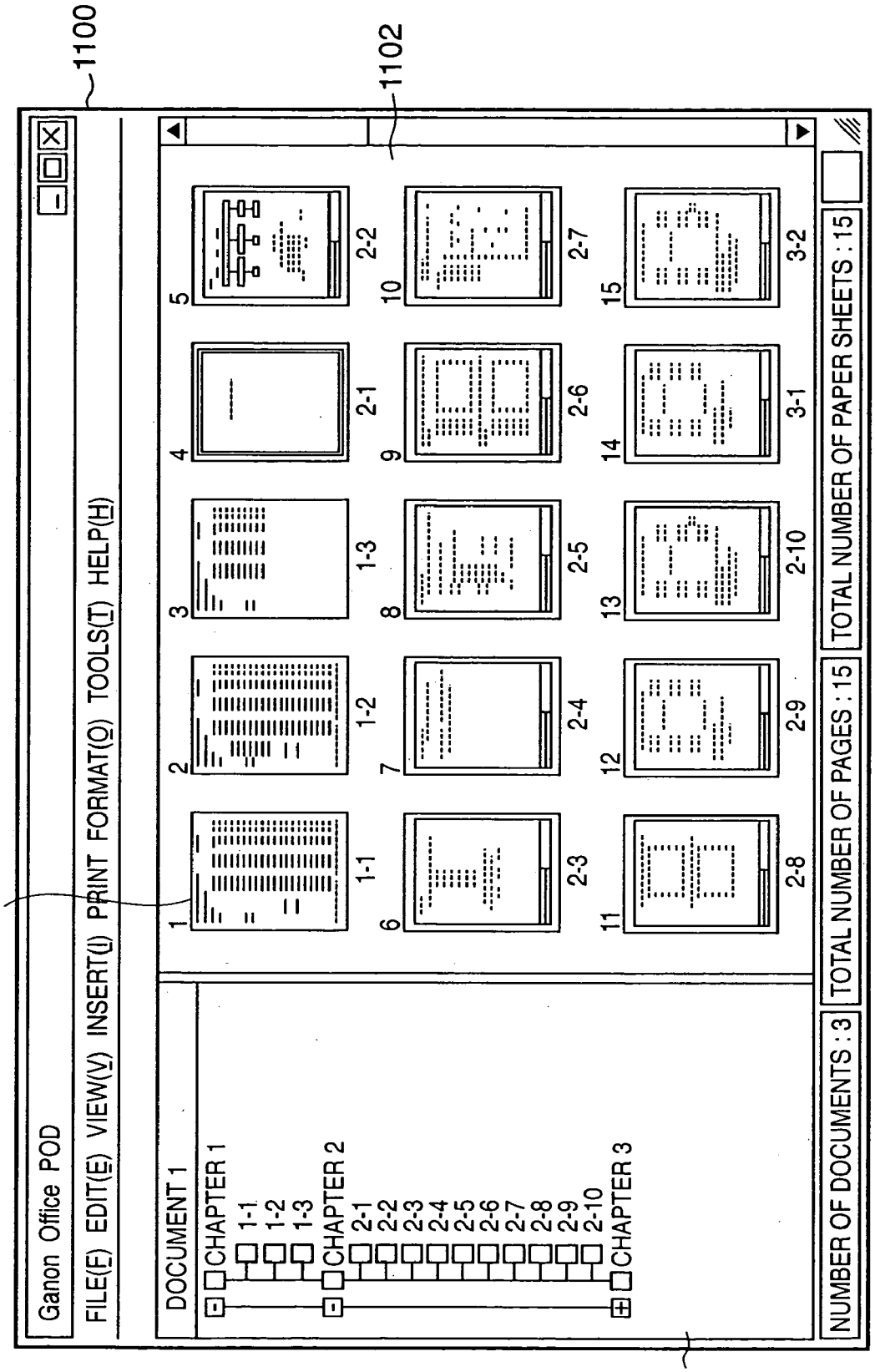
FIG. 5 is a view showing an example of a user interface window when an existing book file is opened.

FIG. 5 is a view showing an example of the displayed UI window.

The UI window 1100 has a tree portion 1101 representing a book structure, and a preview portion 1102 displaying a state to be printed. The tree portion 1101 displays (displays a tree) chapters contained in the book and pages contained in each chapter by a tree structure. The tree portion 1101 displays page numbers, and the page numbers represent document page numbers. The preview portion 1102 displays reduced printing page contents. The display order reflects the book structure.

Application data converted into an electronic document file by the electronic document writer 102 can be added as a new chapter to the open book file. This function is called an "electronic document import function". Conventionally, this function is activated by drag-and-drop operation of application data to the window in a desktop window provided by the OS.

Figure 6:
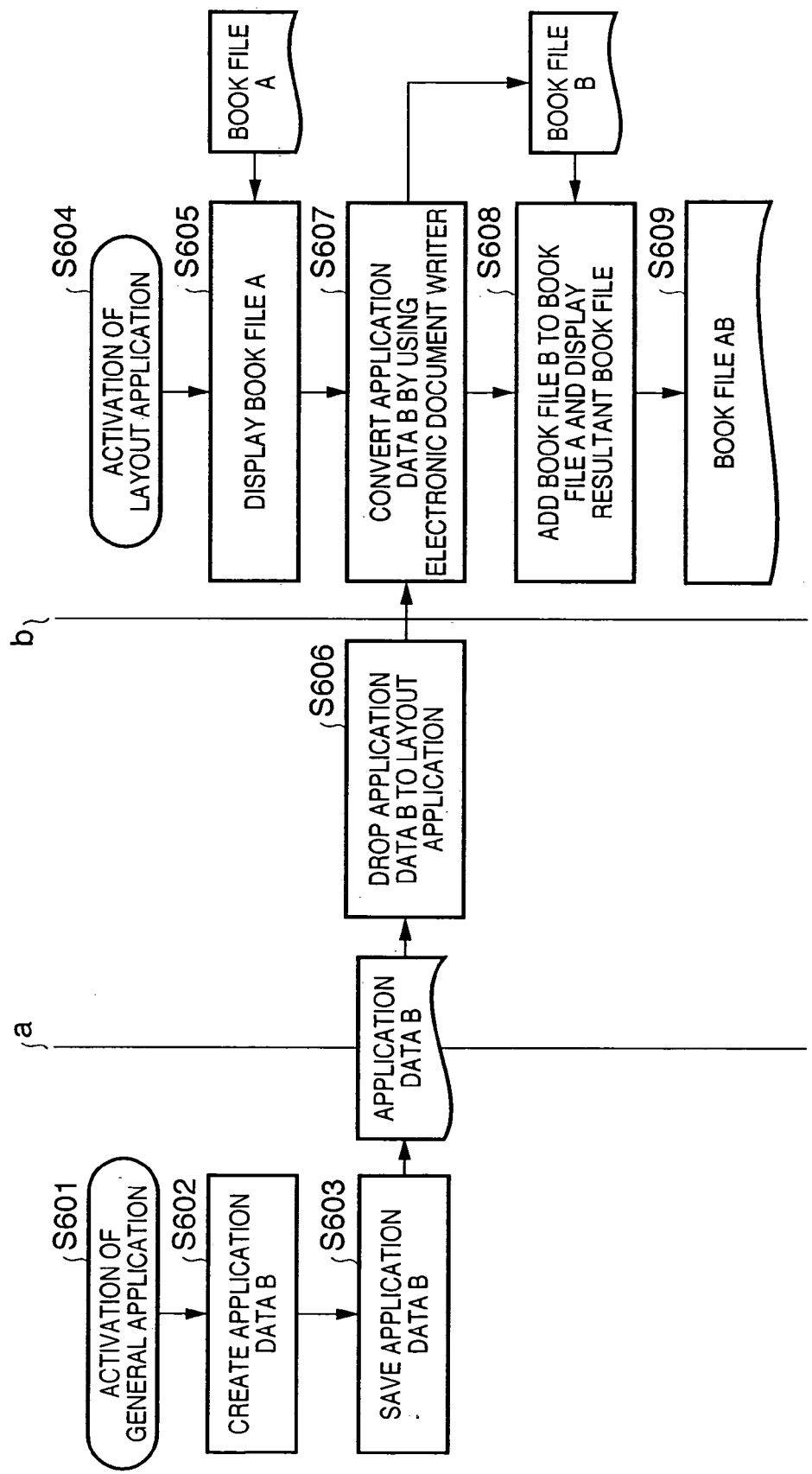
FIG. 6 is a flow chart showing a conventional electronic document import sequence.

FIG. 6 is a flow chart showing a conventional electronic document import sequence. A flow on the left side of a bold line a represents processing of the general application 101; a flow between bold lines a and b, processing of the OS; and a flow on the right side of the bold line b, processing of the layout application 104.

The general application 101 is activated (step S601). The general application creates application data B (step S602), and saves it (step S603). During this operation, the layout application 104 is activated (step S604), and opens and displays, e.g., an existing book file A (step S605). An example of the display form of the UI window is shown in FIG. 5.

In this state, the application data B saved in step S603 is dropped to the UI window which displays the book file A (step S606). The layout application 104 then converts the application data B into a book file B of the electronic document format using the electronic document writer 102 (step S607). The layout application 104 adds the converted book file B to the currently displayed book file A, and displays the resultant book file (step S608). The layout application 104 combines the book files A and B into a book file AB (step S609).

Conventional electronic document import processing has roughly been described above. To add application data created by the general application 101 to a book file in the layout application 104, the application data must be added to the UI window or icon of the layout application 104 by drag-and-drop operation in the desktop window provided by the OS. The application data cannot be directly added from the window of the general application 101, as described above.

Figure 7:
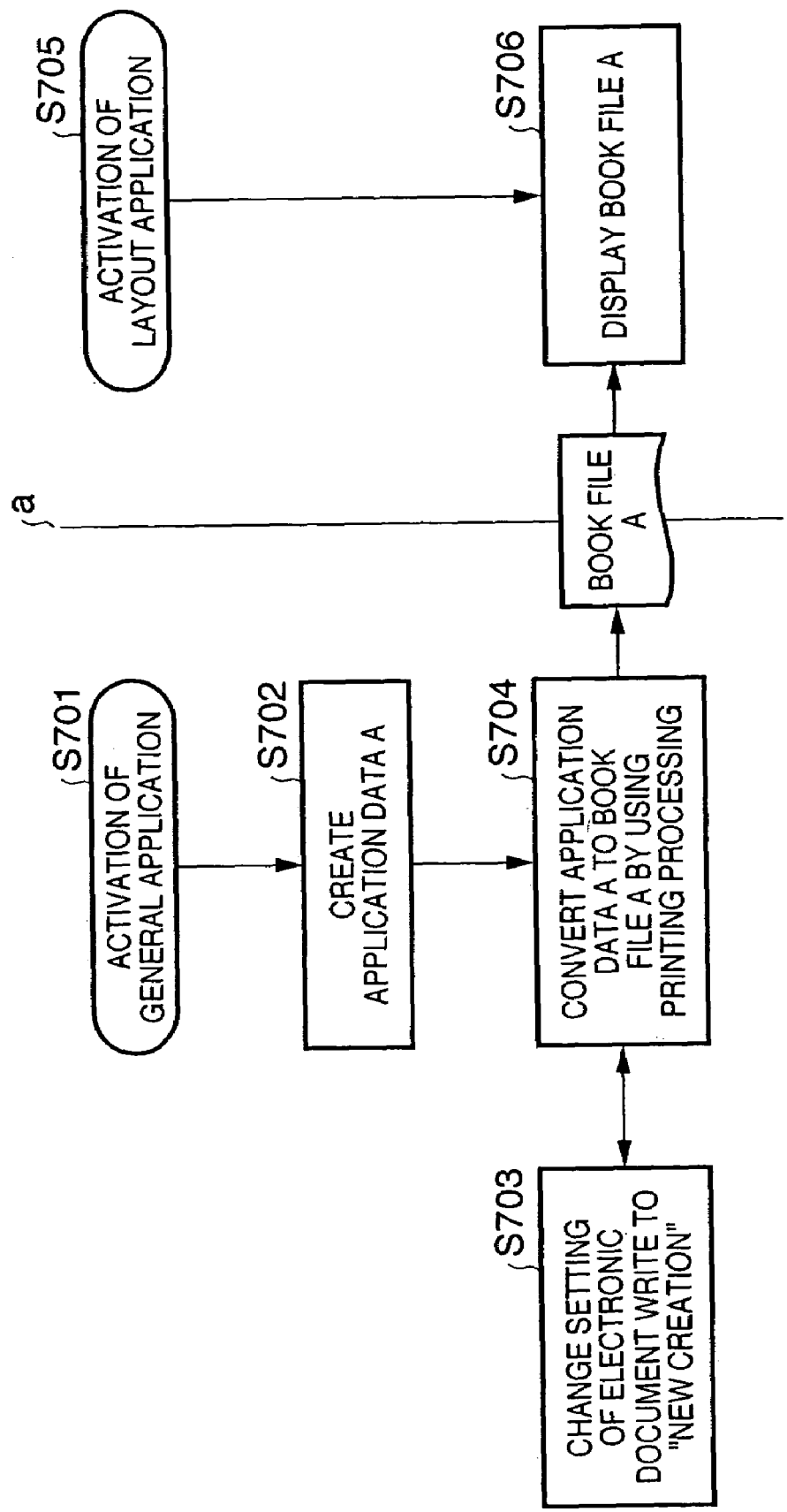
FIG. 7 is a flow chart showing an electronic document import sequence according to the embodiment.

FIG. 7 is a flow chart showing an electronic document import sequence according to the embodiment in which application data is displayed as a new file in the layout application 104. A flow on the left side of a central bold line a represents processing of the general application 101; and a flow on the right side, processing of the layout application 104.

The general application 101 is activated (step S701), and creates application data A (step S702). At the end of creation, a printing sequence starts on the basis of an instruction by the user via a keyboard or mouse. In this embodiment, the electronic document writer 102 can be designated as a printing destination (output destination) instead of a general printer driver. If the electronic document writer 102 is designated as a printing destination, the electronic document writer 102 is activated and converts the application data A into a book file A of the electronic document format (step S704). That is, the user can convert the application data A into the book file A by the same operation as that of printing the application data A.

Before execution of step S704, either "new creation" of newly creating a converted book file or "additional loading" of adding the converted book file to an existing book file can be separately selected in the setting window of the electronic document writer 102. In this case, "new creation" is selected (step S703). If the user knows in advance that "new creation" has been set, the setting window need not be particularly opened.

After that, the layout application 104 is activated (step S705), opens the book file A converted in step S704, and displays it in the UI window (step S706). In step S705, the layout application 104 may be activated automatically in response to execution of step S704 or activated on the basis of a user instruction.

Figure 8:
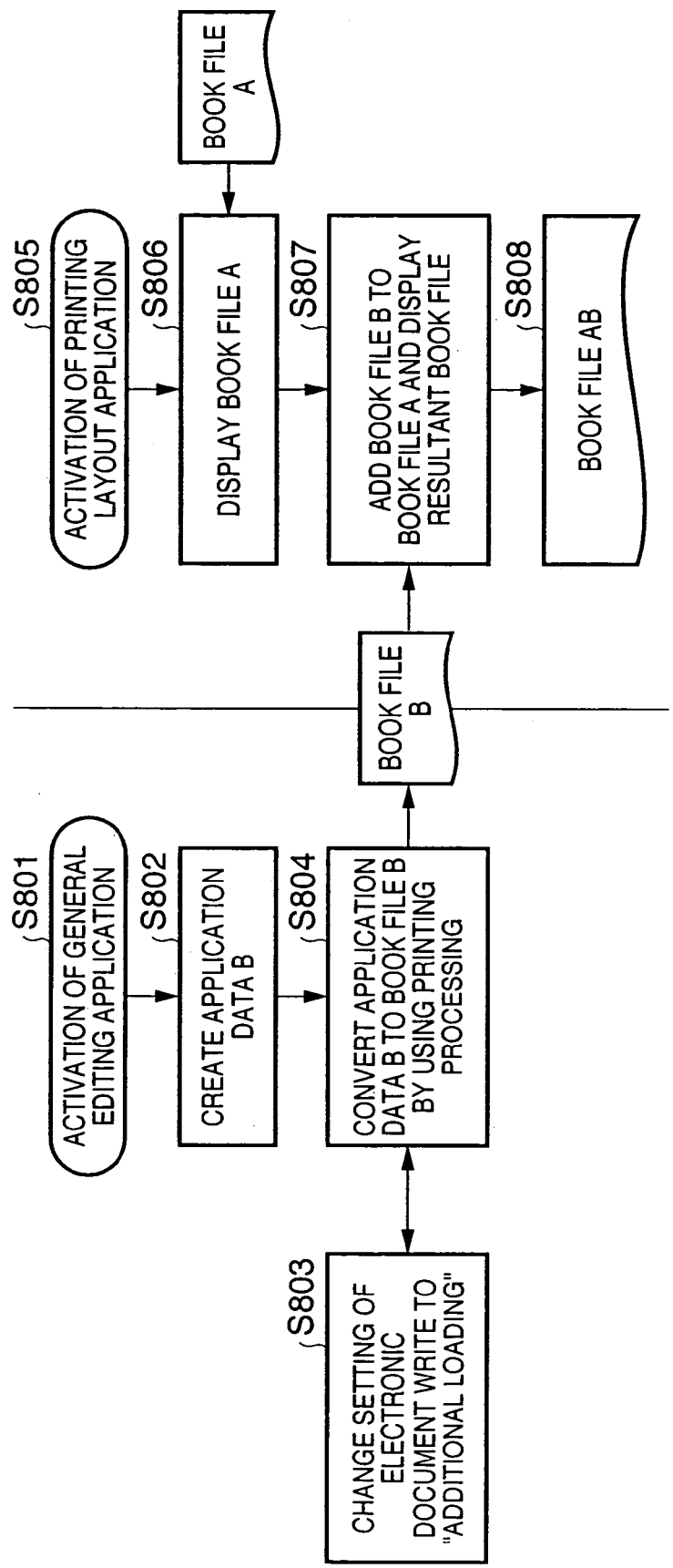
FIG. 8 is a flow chart showing another electronic document import sequence according to the embodiment.

FIG. 8 is a flow chart showing an electronic document import sequence according to the embodiment in which application data is added to a book file that has already been opened by the layout application 104. Similar to FIG. 7, a flow on the left side of a central bold line a represents processing of the general application 101; and a flow on the right side, processing of the layout application 104.

The general application 101 is activated (step S801), and creates application data B (step S802). At the end of creation, a printing sequence starts on the basis of an instruction by the user via a keyboard or mouse. In this embodiment, the electronic document writer 102 can be designated as a printing destination instead of a general printer driver. If the electronic document writer 102 is designated as a printing destination, the electronic document writer 102 is activated and converts the application data B into a book file B of the electronic document format (step S804). That is, similar to FIG. 7, the user can convert the application data B into the book file B by the same operation as that of printing the application data B.

Before execution of step S804, not "new creation" of designating a new creation mode, but "additional loading" of designating a document addition mode is set in the output setting window of the electronic document writer 102 (this window is the property setting window of the electronic document writer 102, and the property window of a general printer driver can be opened by the same operation). If the user knows in advance that "additional loading" has been set, the setting window need not be particularly opened. In step S804, the electronic document writer 102 determines which of the new creation mode and document addition mode has been selected as an output setting.

During this operation, the layout application 104 is activated (step S805), and opens and displays, e.g., an existing book file A (step S806). An example of the display form of the UI window is shown in FIG. 5.

If the document addition mode has been selected in step S804, the layout application 104 acquires the book file B converted in step S804 from the electronic document writer 102, adds the book file B to the book file A, and displays the resultant book file (step S807). The layout application 104 combines the book files A and B into a book file AB (step S808). If the new creation mode has been designated in step S804, the electronic document writer 102 transfers the converted/generated book file B to the layout application 104, and notifies the layout application 104 of the new creation mode. The layout application 104 which has been notified of the new creation mode recognizes the book file B as a new book, and displays the book file B transferred from the electronic document writer 102 as a new book in a window different from that of the existing book file A.

In this way, application data is automatically added to a book file opened by the layout application 104 through a printing operation in the general application 101. This eliminates a cumbersome operation of dropping application data in the desktop window of the OS, greatly simplifying the file insertion operation in the layout application 104.

Figure 9:
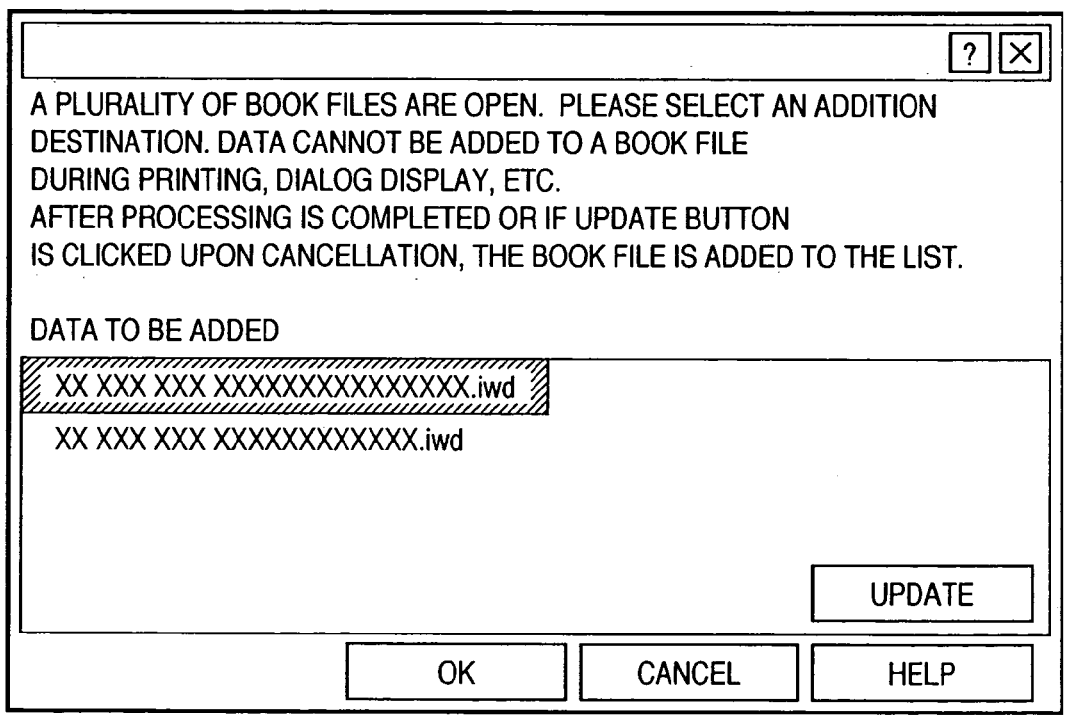
FIG. 9 is a view showing a display example of a UI window for prompting the user to select a book file.

If the layout application 104 has already been activated at the end of executing step S804 and a plurality of book files have been opened, a UI window which prompts the user to select a book file to be inserted is preferably displayed. FIG. 9 is a view showing a display example of the UI window for prompting the user to select a book file. As shown in FIG. 9, book files which have already been opened are listed. However, a book file concerning an operation of, e.g., opening another dialog in the layout application 104 cannot be additionally loaded and is not listed. If the user selects one of listed book files, the book file B is added to the book file.

If the layout application 104 has not been activated yet upon execution of step S804 while the electronic document writer 102 is set to "additional loading", the layout application 104 displays a new window shown in FIG. 4 upon activation, and then "additionally loads" the book file B transferred in step S804. As a result, the layout application 104 performs the same processing as that of FIG. 7 upon activating the layout application 104 in "new creation".

Figure 10:
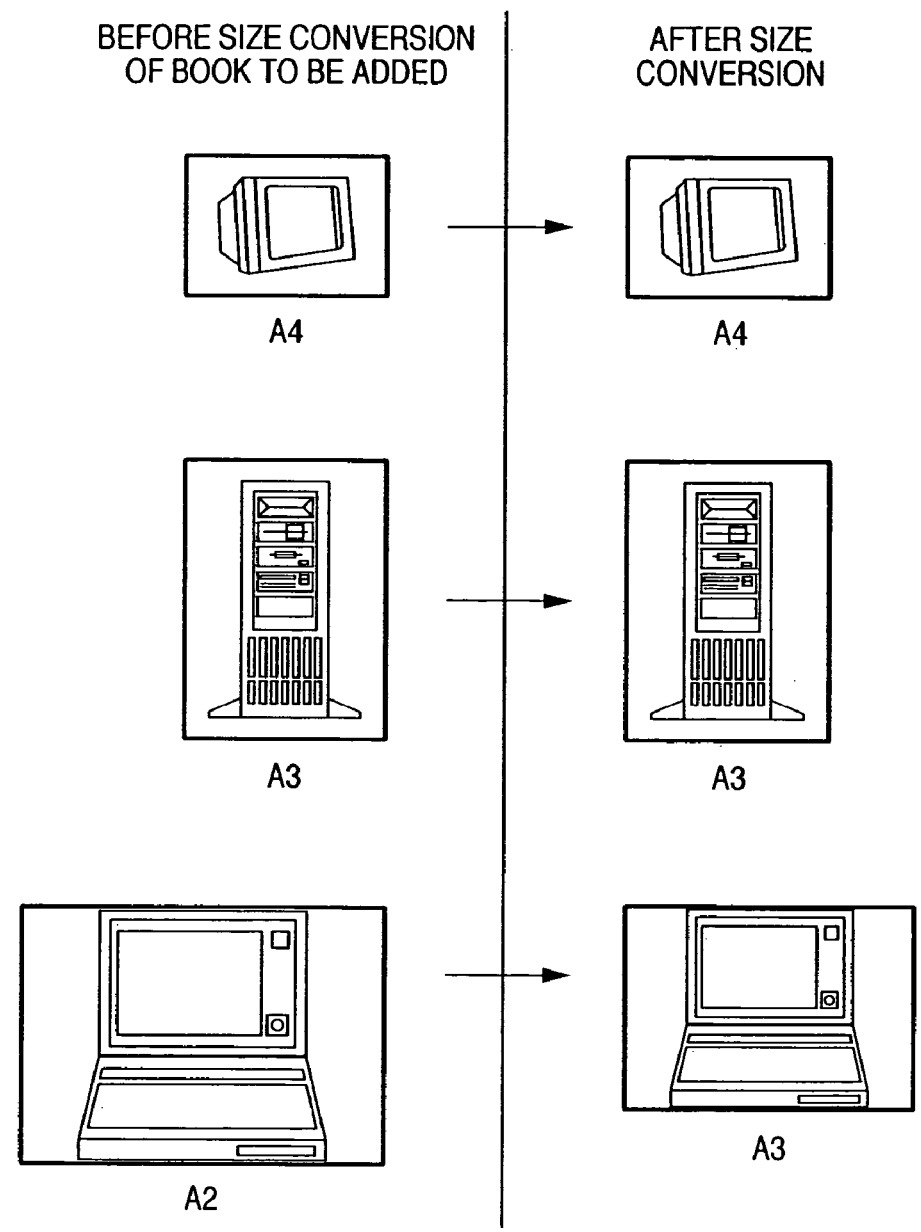
FIG. 10 is a view for explaining a page reduction function according to the embodiment.

To add a book file containing a page exceeding a size processible by the layout application 104 in adding a book file, a function of reducing the page to the processible size is preferably adopted. FIG. 10 is a view for explaining the page reduction function according to the embodiment. As shown in FIG. 10, when the maximum size processible by the layout application 104 is A3, only a page of a book file to be added with a size exceeding A3 is reduced.

As described above, according to the embodiment, the window of the general application allows direct application data insertion operation to the layout application without the mediacy of the desktop window of the OS. The number of work steps by the user decreases, increasing the productivity.

<Other Embodiments>

Note that the present invention can be applied to an apparatus comprising a single device or to a system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (a DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

What is claimed is:

1. A document processing method using a computer which can execute an application program for creating application data, a document writer for acting as a device driver, and a layout program for performing layout processing of document data, comprising:

a conversion step of converting application data created by the application program into a first document data file processible by the layout program by using the document writer, in response to a print instruction from the application program;

an activation step of automatically activating the layout program in response to the conversion processing in said conversion step by using the document writer such that the layout program processes the first document data file converted in said conversion step and displays document data of the processed first document data file on an operating screen; and a setting step of setting either of a first mode in which the layout program newly opens the first document data file obtained in the conversion processing regardless of a second document data file which has already been opened by the layout program before the conversion processing in said conversion step, and a second mode in which the layout program adds the document data of the first document data file obtained in the conversion processing to the second document data file, wherein the document data of the first document data file is displayed in accordance with a mode set in said setting step.

2. The method according to claim 1, wherein, when the second mode is set in said setting step and the second document data file has already been opened by the layout program before the conversion processing in said conversion step, the document data of the first document data file obtained in the conversion processing is added to the second document data file by the layout program.

3. The method according to claim 2, further comprising a selection step of, when a plurality of document data have already been opened by the layout program before the conversion processing in said conversion step, selecting document data to which the document data of the first document data file obtained in the conversion processing is to be added.

4. The method according to claim 2, further comprising a reduction step of, if the document data of the first document data file obtained in the conversion processing exceeds a size processible by the layout program, reducing the document data to the processible size.

5. A computer-executable program which causes a computer having an application program for creating application data, a document writer for acting as a device driver, and a layout program for performing layout processing of document data to execute:

a conversion step of converting application data created by the application program into a first document data file processible by the layout program by using the document writer, in response to a print instruction from the application program;

an activation step of automatically activating the layout program in response to the conversion processing in said conversion step by using the document writer such that the layout program processes the first document data file converted in said conversion step and displays document data of the processed first document file on an operating screen; and a setting step of setting either of a first mode in which the layout program newly opens the first document data file obtained in the conversion processing regardless of a second document data file which has already been opened by the layout program before the conversion processing in said conversion step, and a second mode in which the layout program adds the document data of the first document data file obtained in the conversion processing to the second document data file, wherein the document data of the first document data file is displayed in accordance with a mode set in said setting step.

6. A document processing apparatus having an application program for creating application data, a document writer for acting as a device driver, and a layout program for performing layout processing of document data, comprising:

conversion means for converting application data created by the application program into a first document data file processible by the layout program by using the document writer, in response to a print instruction from the application program;

activation means for automatically activating the layout program in response to the conversion processing by said conversion means by using the document writer such that the layout program processes the first document data file convened by said conversion means and displays document data of the processed first document data file on an operating screen; and setting means for setting either of a first mode in which the layout program newly opens the first document data file obtained in the conversion processing regardless of a second document data file which has already been opened by the layout program before the conversion processing by said conversion means, and a second mode in which the layout program adds the document data of the first document data file obtained in the conversion processing to the second document data file.

wherein the document data of the first document data file is displayed in accordance with a mode set by said setting means.

7. A document processing method using a computer which can execute an application program for creating application data, a document writer for acting as a device driver, and a layout program for performing layout processing of document data, comprising:

a setting step of setting either of a first mode in which a first document data file is newly created regardless of a second document data file opened by the layout program and a second mode in which document data of the first document data file is added to the second document data file opened by the layout program by using the document writer, before a conversion process;

a conversion step of converting application data created by the application program into the document data of the first document data file processible by the layout program by using the document writer, in response to an instruction from the application program;

an addition step of adding the converted document data to the second document data file opened by the layout program in response to the conversion processing in said conversion step, in a case where the second mode is set in said setting step; and a creation step of newly creating the first document data file, which is different from the second document file, including the converted document data in response to the conversion processing in said conversion step, in a case where the first mode is set in said setting step.

8. The method according to claim 7, further comprising a selection step of, when a plurality of existing document data files have already been opened by the layout program, selecting a document data file to which the document data of the first document data file converted in said conversion step is to be added.

9. A document processing apparatus having an application program for creating application data, a document writer for acting as a device driver, and a layout program for performing layout processing of document data, comprising:

setting means for setting either of a first mode in which a first document data file is newly created regardless of a second document data file opened by the layout program and a second mode in which document data of the first document data file is added to the second document data file opened by the layout program by using the document writer, before a conversion process;

conversion means for converting application data created by the application program into the document data of the first document data file processible by the layout program by using the document writer, in response to an instruction from the application program;

addition means for adding the converted document data to the second document data file opened by the layout program in response to the conversion processing by said conversion means, in a case where the second mode is set by said setting means; and creation means for newly creating the first document data file, which is different from the second document file, including the converted document data in response to the conversion processing by said conversion means, in a case where the first mode is set by said setting means.

10. A computer-executable program which causes a computer having an application program for creating application data, a document writer for acting as a device driver, and a layout program for performing layout processing of document data to execute:

a setting step of setting either of a first mode in which a first document data file is newly created regardless of a second document data file opened by the layout program and a second mode in which document data of the first document data file is added to the second document data file opened by the layout program by using the document writer, before a conversion process;

a conversion step of converting application data created by the application program into the document data of the first document data file processible by the layout program by using the document writer, in response to an instruction from the application program;

an addition step of adding the converted document data to the second document data file opened by the layout program in response to the conversion processing in said conversion step, in a case where the second mode is set in said setting step; and a creation step of newly creating the first document data file, which is different from the second document file, including the converted document data in response to the conversion processing in said conversion step, in a case where the first mode is set in said setting step.

* * * * *